Patented Nov. 18, 1952 2,618,555

UNITED STATES PATENT OFFICE 2,618,555

PROCESS FOR POSITIVE DIAZOTYPE AND NEGATIVE METAL REDUCTION IMAGES AND LIGHT-SENSITIVE MATERIAL THEREFOR

Maximilian Karl Reichel, Wiesbaden-Biebrich, Germany, assignor to Kalle & Co. Aktiengesellschaft, Wiesbaden-Biebrich, Germany No Drawing. Application August 5, 1949, Serial No. 108,864. In Germany April 9, 1949

15 Claims. (Cl. 95—6)

This application relates to diazotype light-sensitive materials. It relates more particularly to a diazotype layer capable of reproducing an intermediate print, opaque to ultraviolet light in the high-light areas and ultraviolet light transmittant in the density areas by a dry development process.

The reproduction process to which this invention relates is a negative reproduction process in the sense that the high-light areas of a positive or negative original are reproduced in an opaque color on the print. Such negative reproduction processes are desirable in reproduction work requiring the making of numerous reprints. Negative processes can be generally divided into two classes, namely, latent image and direct printing-out processes. Latent image coatings, such as silver halide gelatin emulsions, have a high sensitivity to light and require a complicated wet or solution process to develop and fix the image. Direct printing-out coatings, such as blueprint paper, require long exposures and also require a wet developing or fixing process, but of a somewhat simpler nature than silver halide emulsion processes. The more common of the latter class of known negative reproduction processes are based on photosensitivity of ferric salts, such as ferric ammonium citrate. In the case of blueprint paper, for instance, the coating is composed of a mixture of ferric ammonium citrate and potassium ferricyanide. On exposure to light, the ferric salt is reduced to the ferrous state and upon immersion in water this ferrous salt forms Turnbull's blue with the ferricyanide. The so-called "Van Dyke"-type paper is coated with a solution composed of ferric ammonium citrate and silver nitrate. Here again, the ferric salt is reduced to the ferrous salt by exposure to light and the ferrous salt chemically reduces the silver nitrate to metallic silver. The thus reduced negative "Van Dyke" image is of a brownish-black color, having a high opacity to actinic light in the negative areas which are a reproduction of the high-lights of the original.

In the processing of these two types of negative reproduction materials, using ferric salts as the photosensitivity in order to reproduce the negative image, it is necessary to employ a number of developing and fixing steps. In the case of the blue-print process, the exposed print is first immersed in a water bath for developing the color, and then finally into a second water bath containing bichromate to intensify the color. A washing operation to remove the bichromate and a drying process has necessarily to follow. In the case of the "Van Dyke" process it is necessary to immerse the exposed print into a water bath for development of the silver image to full density. The unexposed silver salt is then removed by immersion in a dilute thiosulfate bath and finally all soluble salts are removed by immersion in a second water bath.

A negative process similar to the "Van Dyke" process, but employing diazo compounds as the photosensitive elements in place of ferric ammonium citrate is described in USP 2,066,918. In the process of this patent, light-sensitive diazo compounds are coated onto a suitable base, together with silver salts, such as silver nitrate. The diazo compounds are such as will yield, when exposed to light, decomposition products capable of exercising a reduction on the exposed silver salt. On exposure of this printing material under a negative design, the diazo compound under the high-light areas of the original is decomposed by action of the light and the decomposition products of the diazo compound reduce the silver salt to a metallic stage, thus producing a silver picture. This is fixed by immersing in a solution of thiosulfate and then washed with water.

The negative process of USP 2,066,918 has the disadvantage, in common with the prior blueprint and "Van Dyke"-type negative processes, of requiring solution treatments subsequent to exposure for the development and fixing of the image and removal of either the light-sensitive inorganic metal complex or the light-sensitive diazo compound which has not been utilized in the production of the image.

Positive prints from a negative original and vice-versa, however, can be made, without the removal of the light-sensitive material not utilized during the production of the image, if care is taken that the light-sensitive diazo compound still present in the layer is made innocuous by chemical action. This can be done, f. i., by incorporating a suitable coupling component into the light sensitive layer, which coupling component, f. i. one being of phenolic or naphtholic structure, will combine with the undecomposed diazo compound in those areas which have not been exposed to light and forms an azo color having high ultraviolet light transmission characteristics. The diazo compound to be applied in such a diazotype material must be of such kind that its decomposition products are capable of reducing certain metallic salts to their metallic form.

Two images are formed in this case: an opaque negative metal image of the high-light areas of the original and a positive image of the density areas, this positive image being transmittant to ultraviolet light. The greater the difference of the absorption values of these two images, the more satisfactory will be the quality of the positive-on-negative print.

Now, it has been discovered that greatest differences between the two values of opacity and transmittance to ultraviolet light can be obtained in the process of making positive prints from a negative original, and vice-versa, if primary or secondary amines are incorporated into the light-sensitive layer, in combination with the light-sensitive diazo compound and non-light-sensitive metal salt.

This new negative light-sensitive process is based on the known fact that diazo compounds form very easily with primary or secondary amines diazo-amino-, or diazo-imino compounds in the presence of alkali. Compounds such as those mentioned are colorless to only pale colored crystalline substance, insoluble in water. They are hydrolized only in an acid medium, and they are not sensitive to ultraviolet light.

Primary or secondary amines useful with this new negative photographic process are for example: Cyanamide, methylamino-ethane-sulfonic acid, butylamino-acetic acid, cyclohexyl-amino-acetic acid, diethanolamine, sarcosine, taurine, 1-amino-benzene-3,5-dicarboxylic acid, 1-amino-naphthalene-2,4-disulfonic acid, 3-amino-benzene-1,2-dicarboxylic acid, 4-amino-1-methyl-benzene-2-sulfanilide, aniline, monomethyl-aniline, monomethyl-para-toluidine, tetrahydroquinolines and its homologues, morpholine, piperidine, piperazine, a. s. o. Although this coupling with the unused diazo compound is an entirely general reaction, it is my experience, that those components can by no means be selected at random out of this general class, but choice must be made according to fine differences in properties only to be found by experiment.

The sensitized layer of this dry negative light-sensitive material is made in the usual manner for the production of diazotype light-sensitive layers. Thus a coating solution containing the essential components, together with stabilizing materials and such other adjuvants as may be necessary for the particular type of support employed, is made up and applied to the support which may be paper, acetate foil, gelatine coated acetate foil, or other transparent medium. The coating operation is carried out by the use of a doctor blade or by spraying. In the case of the gelatine-coated acetate foil, the image producing materials may be mixed with the gelatine, which latter is then coated on the acetate foil base.

The essential components of the coating solution for the preparation of this new dry negative sensitized layer include:

(1) A light-sensitive diazo compound which decomposes under the action of ultraviolet light to produce a reducing agent;

(2) An aliphatic or aromatic primary or secondary amine which combines with the diazo compound to produce a diazo-amino-, or diazo-imino compound which being colorless has the highest possible ultraviolet transmission characteristics and is in itself non-sensitive to ultraviolet light;

(3) A metal salt which can be readily reduced by the decomposition product of the diazo compound to give a metal image which will be opaque to ultraviolet light.

The diazo compounds suitable for this process must have the property of decomposing to a compound which will exercise a reducing action on the exposed metal salt. They are amino diazo compounds of the benzene and naphthalene series which may be substituted in the nucleus or on the undiazotized amino group by such substituents as alkyl, alkylol, aryl, aralkyl, hydroxy, carboxy and sulfo groups and halogen atoms. As examples of such diazo compounds, there may be mentioned the diazo compounds of p-amino-diethyl aniline, p-amino-N,N-diethyl-meta-toluidine, p-amino-diphenylamine, p-amino-quinoline aniline, p-amino-pyridino aniline, 4-amino-1-cyclohexyl aniline, 4-amino-2-methoxy-1-cyclohexyl-amino-benzene, 4-amino-1-(N-benzyl-N-cyclohexylamino)-benzene, 4-amino-1-(N-ethyl-N-cyclohexylamino)-benzene, 4-amino-1-(N-phenyl-N-cyclohexylamino)-benzene, 2,5-di-ethoxy-4-(N-phenylmercapto-N-acetyl-amino)-1-amino-benzene, 4,4'-di-amino-2,2',5,5'-tetraethoxy-triphenyl methane, N-phenyl-1,2,3,4-tetrahydro-6-aminoquinoline, 5-amino-2-methyl-N-benzyl-2,3-dihydro-indole, 6-amino-9-ethyl-hexahydro-carbazole, N-(4-amino-phenyl)-morpholine, N-(4-amino-phenyl)-piperidine, N-ethyl-N-(4-amino-3-methyl-phenyl)-glycine-amide, 1-(4-amino-phenyl)-pyrrolidine, 4-diethylamino-1-amino-naphthalene, 2-methylamino-1-aminonaphthalene, 4-phenylamino-3-methyl-1-aminonaphthalene, o-amino-dimethyl-meta-toluidine, o-amino-diethyl-aniline, 2-amino-N-methyl-diphenylamine.

These diazo compounds preferably should be used in the form of their stable salt complexes, but such complexes should be selected as will not react with the silver salt to form a light-sensitive silver salt. Thus, the preferred diazo salt complexes are the sulfates, the chlorobenzene-sulfates and the fluoboric acid complexes. Of these, it has been found that the fluoboric acid complexes are the most suitable.

The metal image which is formed in the high-light areas by the reducing action of the light decomposition product of the diazo compound on a reducible metal salt may be derived from any suitable metal salt which is not itself light-sensitive, but which is easily reduced by the means inherent in this process. Metal salts which have been found most suitable are such salts of silver, mercury, and thallium as are not sensitive to ultraviolet light and are easily reducible. Silver, mercurous and thallous nitrates and sulfamates are particularly suitable. Any other non-light-sensitive salts of silver, mercury and thallium may be selected, it being preferable, however, to select such metal salts, the anion of which is derived from a non-volatile acid and which have a solubility greater than that of silver oxalate. Although these properties are not essential, the reduction of the metal salt in the production of the metal image is greatly accelerated, if they are present.

It has been my observation that those diazo compounds of the class suitable for this invention, that is, diazo derivatives of p-diamines of the benzene and naphthalene series, which are substituted in the nucleus, particularly by alkyl radicals, provide light decomposition products which have the greatest reducing capacity for silver formation. Hence, these diazo compounds would produce metal negative images having the greatest possible optical densities. The difference between the transmittance value of the almost colorless diazoamino-, or diazoimino layer and the highest possible optical density of the produced metallic layer opaque to ultraviolet light would then be of the optimum range.

Although the formation of the metal image by reduction of the non-light-sensitive silver, mercurous or thallous salt by the light decomposition product of the diazo compound is primarily influenced by the rate of reduction of the said light decomposition product of the diazo compound, the high opacity of the metal image is also to some extent influenced by the quantity of metal salt present in the light-sensitive layer. It has been observed that an increase in the concentration of the silver salt in the otherwise unchanged composition of the coating solution results in an improvement of the opacity of the metal image. Concentrations greater than 3% are desirable for optimum results.

The light-sensitive layers of this process are eminently suitable for the reproduction of positive prints from a photographic negative by a dry process utilizing the diazotype-silver salt layers of this process as transition prints. The production of the image on the transition print takes place in such a way that upon exposure to a suitable light source under the negative to be copied, the ultraviolet light decomposes the light-sensitive diazo compound in those areas which are not protected by the silver of the photographic negative. This decomposition product of the light-sensitive diazo compound, which is distinguished by a strong reducing capacity, acts upon the metal salt and forms a metal layer in those areas when it is subsequently treated with a substance of alkaline action, such as gaseous ammonia. The result is a yellowish-brown image in those areas where the photographic negative was transmittant to ultraviolet light, that is, the high-light areas of the negative. At the same time that this opaque metal layer is being formed by the action of gaseous ammonia or other alkaline substance, a diazo-amino-, or diazo-imino compound is generated by means of coupling of the undecomposed diazo compound with the primary or secondary amine where the negative being copied has not been transmittant to ultraviolet light, that is the density areas of the original negative. In those areas, the diazo compound has not been decomposed to a compound which will reduce the silver salt; hence, no metal is deposited in those areas upon action of the alkaline agent, such as ammonia gas. The diazo-amino-, or diazo-imino compound which is formed in those areas will be transmittant to ultraviolet light, whereas the yellowish-brown or sepia image of the high-light areas of the negative will be opaque to ultraviolet light. Hence, in the copying of a photographic negative, the net result is a negative diazo-amino-, or diazo-imino compound covered image, with a sepia background which appears visually to be a negative print, duplicating the characteristics of the original photographic negative. When this print, however, is used as a transition or master print for the making of the usual diazotype prints, that is, prints employing only the components necessary for the production of a colored diazotype print and no reducible metal salts, a positive image is produced. This is due to the fact that the diazo-amino-, or diazo-imino compound covered areas, being almost colorless, produced on the transition print or master negative transmits the ultraviolet light, thus producing high-lights in those areas of the final print, whereas the sepia background containing the metal image is opaque to ultraviolet light, thus producing a colored image in those areas on the final print.

In order that the invention of this application may be more clearly understood and more readily carried into effect, reference is made to the following typical examples, it being understood that these examples are illustrated and are not in any way intended to limit the scope of the invention. The parts are by weight, unless otherwise specified.

(1) A light-sensitive diazotype coating solution consisting of 6.5 parts of the fluoroboric acid salt of diazotized p-amino-diethylaniline,
100 parts of citric acid,
4.5 parts of morpholine,
50 parts of silver nitrate, per liter is applied on a suitable support, such as paper, acetate foil, or gelatine-coated acetate foil. On exposure to ultraviolet light under a negative pattern, a reddish picture is obtained which is already visible. This ultraviolet light exposed print then is developed with gaseous ammonia producing simultaneously a diazo-imino compound of a very pale colored shade in those parts of the design which were protected from the ultraviolet light during the exposure and a yellowish-brown color of metallic silver in the portions which were exposed to ultraviolet light. Using this print as an original or master print in combination with regular light-sensitive diazotype material (containing the diazo compound and the azo component in the same layer), only a positive print of the original negative pattern is obtained. The almost colorless diazo-imino compound covered portions of the transition picture appearing as a negative image, transmit the ultraviolet rays, and consequently destroy the light-sensitive diazo complex of the final printing material; whereas, the metal image, opaque to ultraviolet light, preserves the diazo complex of the final printing material, and consequently produces the final positive reprint.

50 parts of mercurous nitrate or thallous nitrate may be substituted for the 50 parts of silver nitrate in this example with the production of similar results.

(2) The composition of the coating solution is the same as in Example 1, but as a diazo compound, 7 parts of the fluoboric acid complex of diazotized p-amino-N,N-diethyl-meta-toluidine per liter are used instead of 6.5 parts of the fluoboric acid salt of diazotized p-amino-diethylaniline. On exposure to ultraviolet light under a negative pattern and development of the exposed print with gaseous ammonia an almost colorless negative print and a yellowish-brown positive image are obtained.

(3) The composition of the coating solution is the same as in Example 1, but as an imino compound, 7 parts of sarcosine are used per liter instead of 4.5 parts of morpholine. On exposure to ultraviolet light under a negative pattern and development of the exposed print with gaseous ammonia, an almost colorless negative print and a yellowish-brown positive image are obtained.

(4) The composition of the coating solution is the same as in Example 1, but as an imino compound, 7 parts of methyl-amino-ethane-sulfonic acid per liter are used instead of 4.5 parts of morpholine. On exposure to ultraviolet light under a negative design and development of the print with gaseous ammonia, an almost colorless diazo-imino negative print and a yellowish-brown positive image are obtained.

(5) The composition of the coating solution is the same as in Example 1, but as a metal salt, 60 parts of silver sulfamate per liter are used instead of 50 parts of silver nitrate. On exposure to ultraviolet light under a negative original and development of the exposed print with gaseous ammonia, an almost colorless negative print and a yellowish-brown positive image are obtained. The same results may be obtained by using 60 parts of mercurous sulfamate, or thallous sulfamate in place of the 60 parts of silver sulfamate.

(6) The composition of the coating solution is the same as in Example 2, but as silver salt, 60 parts of silver sulfamate per liter are used instead of 50 parts of silver nitrate. On exposure to ultraviolet light under a negative original and development of the exposed print with gaseous ammonia, an almost colorless negative print and a yellowish-brown positive image are obtained.

(7) The composition of the coating solution is the same as in Example 2, but as the diazo compound, 7 parts of the fluoboric acid salt of diazotized p-amino-diphenyl-amine per liter are used instead of 7 parts of the fluoboric acid complex of diazotized p-amino-diethyl-meta-toluidine. On exposure to ultraviolet light under a negative original and development of the exposed print with gaseous ammonia, an almost colorless negative print and a yellowish-brown positive image are obtained.

(8) The composition of the coating solution is the same as in Example 2, but as an imino compound 12.4 parts of 4-amino-1-methyl-benzene-2-sulfanilide per liter are used instead of 4.5 parts of morpholine. On exposure to ultraviolet light under a negative original and development of the exposed print with gaseous ammonia, an almost colorless negative print and a yellowish-brown positive image are obtained.

(9) The composition of the coating solution is the same as in Example 2, but as an imino compound 10.8 parts of 1-methyl-2-ethylamino-benzene-4-sulfonic acid per liter are used instead of 4.5 parts of morpholine. On exposure to ultraviolet light under a negative original and development of the exposed print with gaseous ammonia, an almost colorless negative print and a yellowish-brown positive image are obtained.

(10) The composition of the coating solution is the same as in Example 2, but as an amino compound 3 parts of cyanamide per liter are used instead of 4.5 parts of morpholine. On exposure to ultraviolet light under a negative original and development of the exposed print with gaseous ammonia, an almost colorless negative print and a yellowish positive image are obtained.

(11) The composition of the coating solution is the same as in Example 2, but as an amino compound 4.5 parts of aminobenzene per liter are used instead of 4.5 parts of morpholine. On exposure of this coated material to ultra-violet light under a negative original and development of the exposed print with gaseous ammonia, an almost colorless negative print and a yellowish positive image are obtained.

(12) The composition of the coating solution is the same as in Example 2, but as a metal salt, 60 parts of silver sulfamate per liter are used instead of 50 parts of silver nitrate. On exposure to ultraviolet light under a negative original and development of the exposed print with gaseous ammonia, an almost colorless negative print and a yellowish-brown positive image are obtained.

(13) The composition of the coating solution is the same as in Example 9, but as a metal salt 60 parts of silver sulfamate per liter are used instead of 50 parts of silver nitrate. On exposure to ultraviolet light under a negative original and development of the exposed print with gaseous ammonia, an almost colorless negative print and a yellowish-brown positive image are obtained.

(14) The composition of the coating solution is the same as in Example 11, but as a metal salt 60 parts of silver sulfamate per liter are used instead of 50 parts of silver nitrate. On exposure to ultraviolet light under a negative original and development of the exposed print with gaseous ammonia, an almost colorless negative print and a yellowish-brown positive image are obtained.

The disclosure clearly teaches that one skilled in the art may modify the combinations herein disclosed and use other materials having the characteristics herein described for producing the combinations herein described without departing from the spirit and scope of the invention.

I claim:

1. A light-sensitive diazotype layer comprising the fluoboric acid salt of diazotized p-amino-diethyl-aniline, morpholine and silver nitrate.

2. A light-sensitive diazotype layer comprising the fluoboric acid salt of diazotized p-amino-diethyl-aniline, sarcosine and silver nitrate.

3. A light-sensitive diazotype layer comprising the fluoboric acid salt of diazotized p-amino-diethyl-aniline, 1-methyl-2-ethylamino-benzene-4-sulfonic acid, and silver nitrate.

4. A light-sensitive diazotype layer comprising the fluoboric acid salt of diazotized p-amino-N,N-diethyl-meta - toluidine, 4-amino-1-methylbenzene-2-sulfanilide and silver sulfamate.

5. A light-sensitive diazotype layer comprising the fluoboric acid salt of diazotized p-amino-diethyl-aniline, aminobenzene and silver nitrate.

6. A light sensitive layer containing a reducible non-light-sensitive metal salt selected from the group consisting of silver, mercury and thallium salts having a water solubility greater than that of silver oxalate, a diazo compound selected from the group of amino diazo compounds of the benzene and naphthalene series substituted in the nucleus by such a substituent as alkyl, alkylol, aryl, aralkyl, hydroxy, carboxy, sulfo groups and halogen atoms, such diazo compounds substituted on the undiazotized amino group by the same type of substituent and such diazo compounds substituted in both the nucleus and the undiazotized amino group by the same type of substituent and a coupling component selected from the group consisting of aliphatic amino compounds, aliphatic imino compounds, aromatic amino compounds, and aromatic imino compounds which will combine with the undecomposed diazo compound in an alkaline medium to form an azo compound having high ultraviolet light transmission characteristics.

7. A light sensitive layer containing a reducible non-light sensitive metal salt selected from the group consisting of silver, mercury and thallium salts having a water solubility greater than that of silver oxalate, a diazo compound selected from the group of amino diazo compounds of the benzene and naphthalene series substituted in the nucleus by such a substituent as alkyl, alkylol, aryl, aralkyl, hydroxy, carboxy, sulfo groups and halogen atoms, such diazo compounds substituted on the undiazotized amino group by the same type of substituent and such diazo compounds substituted in both the nucleus and the undiazotized amino group by the same type of substituent and an aliphatic amino compound as a coupling component which will combine with the undecomposed diazo compound in an alkaline medium to form an azo compound having high ultra-violet light transmission characteristics.

8. A light sensitive layer containing a reducible non-light-sensitive metal salt selected from the group consisting of silver, mercury and thallium salts having a water solubility greater than that of silver oxalate, a diazo compound selected from the group of amino diazo compounds of the benzene and naphthalene series substituted in the nucleus by such a substituent as alkyl, alkylol, aryl, aralkyl, hydroxy, carboxy, sulfo groups and halogen atoms, such diazo compounds substituted on the undiazotized amino group by the same type of substituent and such diazo compounds substituted in both the nucleus and the undiazotized amino group by the same type of substituent and an aliphatic imino compound as a coupling component which will combine with the undecomposed diazo compound in an alkaline medium to form an azo compound having high ultraviolet light transmission characteristics.

9. A light sensitive layer containing a reducible non-light-sensitive metal salt selected from the group consisting of silver, mercury and thallium salts having a water solubility greater than that of silver oxalate, a diazo compound selected from the group of amino diazo compounds of the benzene and naphthalene series substituted in the nucleus by such a substituent as alkyl, alkylol, aryl, aralkyl, hydroxy, carboxy, sulfo groups and halogen atoms, such diazo compounds substituted on the undiazotized amino group by the same type of substituent and such diazo compounds substituted in both the nucleus and the undiazotized amino group by the same type of substituent and an aromatic amino compound as a coupling component which will combine with the undecomposed diazo compound in an alkaline medium to form an azo compound having high ultraviolet light transmission characteristics.

10. A light sensitive layer containing a reducible non-light-sensitive metal salt selected from the group consisting of silver, mercury and thallium salts having a water solubility greater than that of silver oxalate, a diazo compound selected from the group of amino diazo compounds of the benzene and naphthalene series substituted in the nucleus by such a substituent as alkyl, alkylol, aryl, aralkyl, hydroxy, carboxy, sulfo groups and halogen atoms, such diazo compounds substituted on the undiazotized amino group by the same type of substituent and such diazo compounds substituted in both the nucleus and the undiazotized amino group by the same type of substituent and an aromatic imino compound as a coupling component which will combine with the undecomposed diazo compound in an alkaline medium to form an azo compound having high ultraviolet light transmission characteristics.

11. A light sensitive layer comprising a reducible non-light-sensitive metal salt selected from the group consisting of silver, mercury and thallium salts having a water solubility greater than that of silver oxalate, a diazo compound derived from a p-diamino compound of the benzene series substituted at least once on one of the two amino groups in such form that it will not react to convert said metal salt to a light sensitive form but capable of being decomposed by actinic light to produce a reducing agent for the metal salt and a coupling component selected from the group consisting of aliphatic amino compounds, aliphatic imino compounds, aromatic amino compounds and aromatic imino compounds which will combine with the undecomposed diazo compound in an alkaline medium to form an azo compound having high ultraviolet light transmission characteristics.

12. A light sensitive layer comprising a reducible non-light-sensitive metal salt selected from the group consisting of silver, mercury and thallium salts having a water solubility greater than that of silver oxalate, a diazo compound derived from a p-diamino compound of the benzene series substituted at least once on one of the two amino groups and bearing at least one ring substituent selected from the group consisting of alkyl, alkoxy and alkylol groups in such form that it will not react to convert said metal salt to a light sensitive form but capable of being decomposed by actinic light to produce a reducing agent for the metal salt and a coupling component selected from the group consisting of aliphatic amino compounds, aliphatic imino compounds, aromatic amino compounds and aromatic imino compounds which will combine with the undecomposed diazo compound in an alkaline medium to form an azo compound having high ultraviolet light transmission characteristics.

13. A light sensitive layer comprising a reducible non-light-sensitive metal salt selected from the group consisting of silver, mercury and thallium salts having a water solubility greater than that of silver oxalate, a diazo compound derived from a p-diamino compound of the benzene series substituted at least once on one of the two amino groups and bearing at least one alkyl group as a ring substituent in such form that it will not react to convert said metal salt to a light sensitive form but capable of being decomposed by actinic light to produce a reducing agent for the metal salt and a coupling component selected from the group consisting of aliphatic amino compounds, aliphatic imino compounds, aromatic amino compounds and aromatic imino compounds which will combine with the undecomposed diazo compound in an alkaline medium to form an azo compound having high ultraviolet light transmission characteristics.

14. A light sensitive layer comprising a reducible non-light-sensitive metal salt selected from the group consisting of silver, mercury and thallium salts having a water solubility greater than that of silver oxalate, a fluoboric acid salt of a diazo compound derived from a p-diamino compound of the benzene series substituted at least once on one of the two amino groups and bearing at least one alkyl group as a ring substituent in such form that it will not react to convert said metal salt to a light sensitive form but capable of being decomposed by actinic light to produce a reducing agent for the metal salt and a coupling component selected from the group consisting of aliphatic amino compounds, aliphatic imino compounds, aromatic amino compounds and aromatic imino compounds which will combine with the undecomposed diazo compound in an alkaline medium to form an azo compound having high ultraviolet light transmission characteristics.

15. The method of producing a positive ultraviolet light transmitting image on a negative ultraviolet light opaque background which comprises the steps of exposing to light through a master, a light sensitive layer comprising a reducible non-light-sensitive metal salt selected from the group consisting of silver, mercury and thallium salts having a water solubility greater than that of silver oxalate, a diazo compound selected from the group of amino diazo compounds of the benzene and naphthalene series substituted in the nucleus by such a substituent as alkyl, alkylol, aryl, aralkyl, hydroxy, carboxy, sulfo groups and halogen atoms, such diazo compounds substituted on the undiazotized amino group by the same type of substituent and such diazo compounds substituted in both the nucleus and on the undiazotized amino group by the same type of substituent and a coupling component selected from the group consisting of aliphatic amino compounds, aliphatic imino compounds, aromatic amino compounds and aromatic imino compounds to decompose said diazo compound in the light struck areas thereby causing the decomposition products of said diazo compound to reduce said metallic salt in said light struck areas to form an opaque metal negative and subjecting said layer to an alkaline developing medium to cause the undecomposed diazo compound in the areas not struck by light to couple with said coupling component to form a positive azo compound image having high ultraviolet light transmission characteristics.

MAXIMILIAN KARL REICHEL.

REFERENCES CITED

The following references are of record in the file of this patent:

UNITED STATES PATENTS

| Number | Name | Date |
|---|---|---|
| 2,066,918 | Poser et al. | Jan. 5, 1937 |
| 2,067,690 | Alink et al. | Jan. 12, 1937 |
| 2,150,834 | Holst et al. | Mar. 14, 1939 |
| 2,183,447 | Dippel et al. | Dec. 12, 1939 |
| 2,212,959 | Schmidt et al. | Aug. 27, 1940 |
| 2,537,007 | Von Glahn et al. | Jan. 2, 1951 |
| 2,537,097 | Slifkin | Jan. 9, 1951 |
| 2,537,106 | Von Glahn et al. | Jan. 9, 1951 |